United States Patent [19]
Kaufman et al.

[11] 3,974,712
[45] Aug. 17, 1976

[54] AUXILIARY BRAKE LEVER

[75] Inventors: Alan D. Kaufman, Williamsport; Arne M. Reistad, Jr., Philadelphia; David J. Wilke, York, all of Pa.

[73] Assignee: Pennsylvania Wire Rope Corporation, Williamsport, Pa.

[22] Filed: July 16, 1975

[21] Appl. No.: 596,169

[52] U.S. Cl. ............................ 74/479; 74/99 A; 74/107; 74/489
[51] Int. Cl.² .................. B62K 23/06; B62L 3/02
[58] Field of Search ............ 74/479, 489, 99 A, 107

[56] References Cited
UNITED STATES PATENTS

| | | | |
|---|---|---|---|
| 3,719,104 | 3/1973 | Dian | 74/489 |
| 3,776,061 | 12/1973 | Kiyokazu | 74/489 X |
| 3,861,234 | 1/1975 | Cristie | 74/489 X |
| 3,896,680 | 7/1975 | Shoemaker | 74/489 |

*Primary Examiner*—Allan D. Herrmann
*Attorney, Agent, or Firm*—Brady, O'Boyle & Gates

[57] ABSTRACT

An auxiliary brake lever for actuating the brakes of a bicycle wherein the auxiliary brake lever is operable independently of the main brake lever.

6 Claims, 7 Drawing Figures

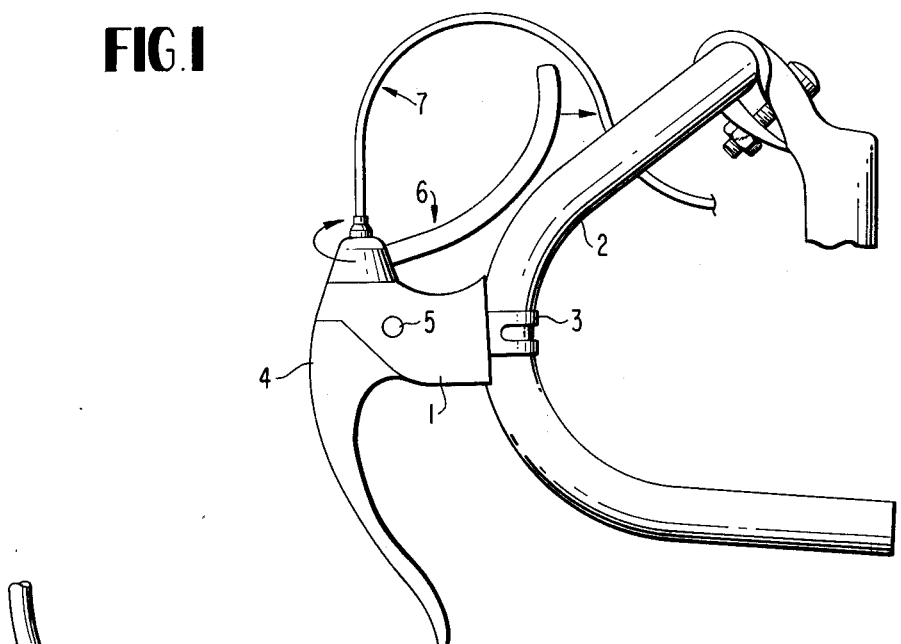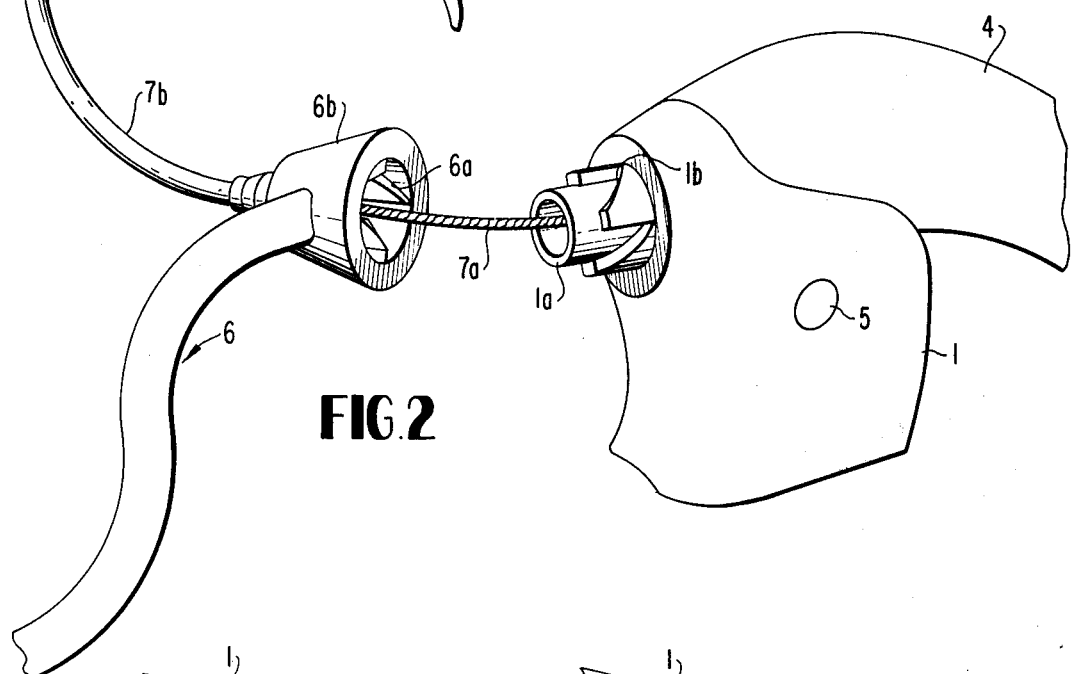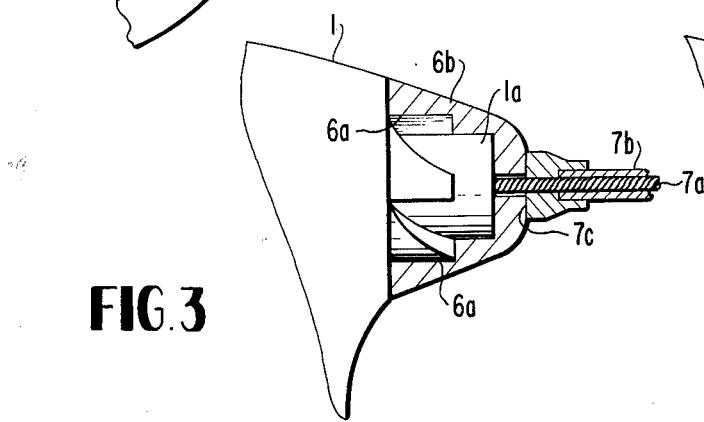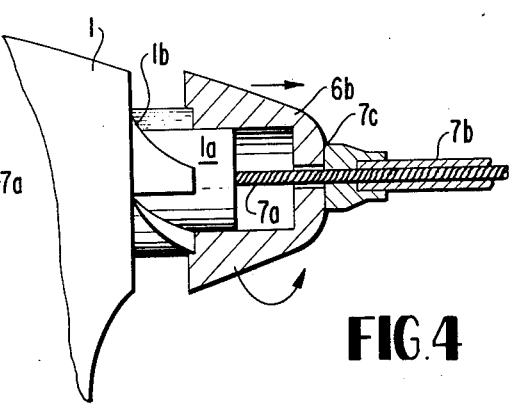

AUXILIARY BRAKE LEVER

BACKGROUND OF THE INVENTION

A bicycle brake operating device having a main brake lever and an auxiliary brake lever wherein the auxiliary brake lever is operable independently of the main brake lever is known, as evidenced by U.S. Pat. No. 3,719,104 dated Mar. 6, 1973.

The auxiliary brake lever of the present invention functions in a similar manner; however, it is characterized by its simplicity of construction, having few moving parts; thus, not likely to get out of order even after long and continued use.

The auxiliary brake lever of the present invention comprises, essentially, a cam surface provided on the housing of the main brake lever, and a cooperating cam follower surface provided on the hub of the auxiliary brake lever, the configuration of the cam surface being constructed and arranged whereby rotational movement of the auxiliary brake lever imparts axial movement to the lever hub to thereby apply a compressive force on the cable sheath, flexing the sheath to react against a normally taut flexible cable and move the cable along the sheath to apply the brake shoes to the rim of the bicycle wheel.

DESCRIPTION OF THE DRAWINGS

FIG. 1 is a side elevational view showing the main and auxiliary brake operating levers mounted in operative position on a bicycle handle bar;

FIG. 2 is an exploded perspective view showing the details of one embodiment of the cam configuration provided on the main brake lever housing and the cam follower configuration provided on the hub of the auxiliary brake lever;

FIG. 3 is a fragmentary, side elevational view, partly in section, showing the inoperative position of the auxiliary brake lever;

FIG. 4 is a fragmentary, side elevational view, partly in section, showing the operative position of the auxiliary brake lever;

DESCRIPTION OF THE PREFERRED EMBODIMENTS OF THE INVENTION

Figure 5:
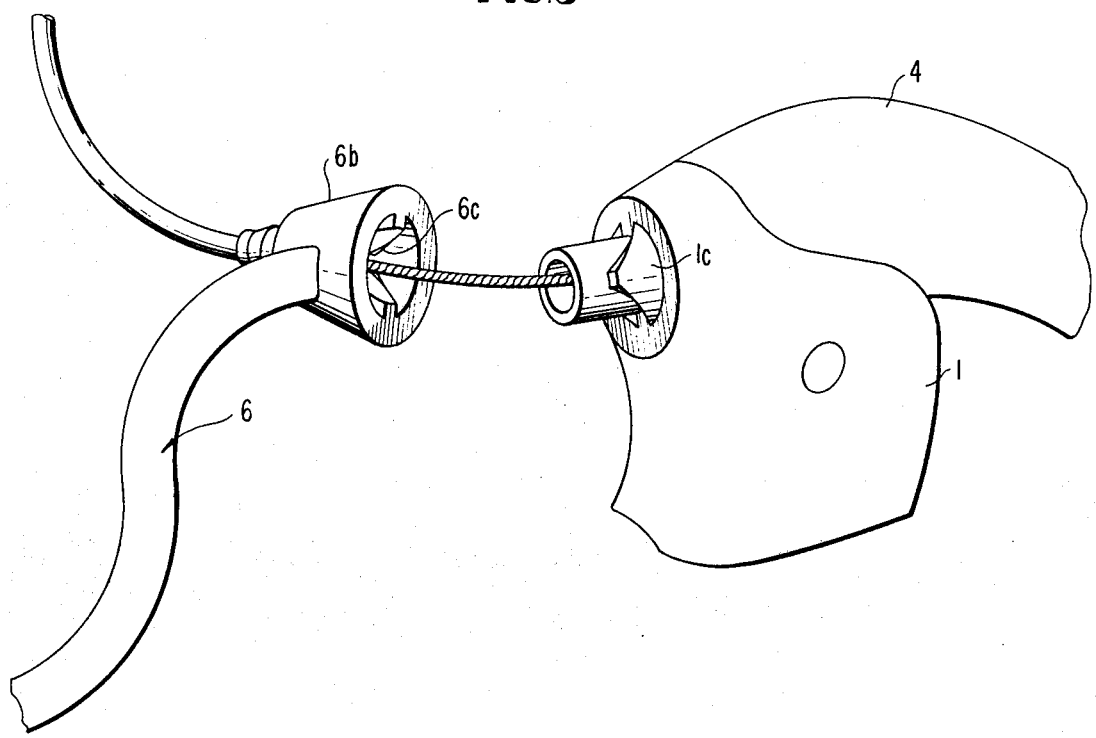
FIG. 5 is an exploded, perspective view showing the details of another embodiment of the cam and cam follower configuration provided on the main brake lever housing and auxiliary brake lever hub, respectively.

Referring to the drawings and more particularly to FIG. 1 thereof, a housing 1 is secured to the bicycle handle bar 2 by a suitable strap 3, the housing having the main brake lever 4 pivotally connected thereto as at 5. The auxiliary brake lever 6 is rotatably mounted on the front or nose portion of the housing 1 and is operative to actuate the bicycle brakes, through Bowden cable 7, when moved in the direction of the arrows, to be described more fully hereinafter. The location of the main brake lever 4 and auxiliary brake lever 6 relative to the handle bar 2 is such that the main brake lever is operable from the hand grips of the handle bar and the auxiliary brake lever is operable from the cross bar of the handle bar.

The details of the auxiliary brake lever are shown in FIG. 2, wherein the nose of the housing is provided with an outwardly extending cylindrical sleeve 1a having a helical cam surface 1b formed on the outer peripheral surface thereof. The cam surface 1b is adapted to engage a similarly configured helical groove 6a formed in the inner peripheral surface of a hub 6b connected to the auxiliary lever 6.

The Bowden cable 7 for actuating the brakes includes a tension cable or wire 7a having one end connected to the main brake lever 4 and the opposite end connected to the linkage of a caliper-type brake assembly, not shown. The cable is also provided with a sheath 7b in which the wire 7a is slidably mounted, the end of the sheath abutting the face of the hub as at 7c, whereby the tension in the Bowden cable maintains the hub 6b against the front face of the housing 1 as shown in FIG. 3.

In the operation of the auxiliary brake lever, when the lever 6 is actuated to cause rotation of the hub 6b, as shown in FIG. 4, the helical cam surface 1b causes axial movement of the hub against the end 7c of the cable sheath, to thereby apply a compressive force on the cable sheath 7b, flexing the sheath to react against the normally taut flexible cable 7a, whereby the relative movement between the sheath and cable causes the brake shoes to be applied to the rim of the bicycle wheel.

Figure 6:
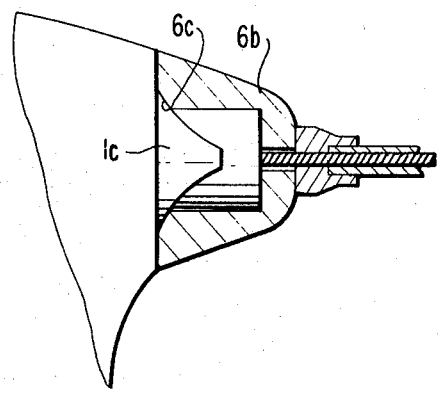
FIG. 6 is a fragmentary, side elevational view, partly in section, showing the auxiliary brake lever embodiment of FIG. 5 in the inoperative position.
Figure 7:
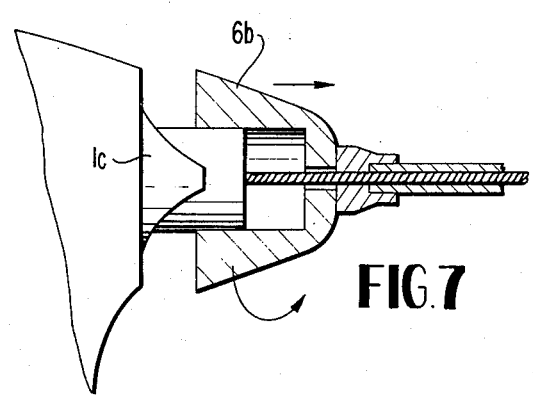
FIG. 7 is a fragmentary, side elevational view, partly in section, showing the auxiliary brake lever embodiment of FIG. 5 in the inoperative position.

While the cam surfaces in the embodiment shown in FIGS. 2 to 4 are helical, it is contemplated that other cam configurations can also be employed to obtain the desired axial movement of the hub 6b against the end of the cable sheath upon rotation of the auxiliary lever 6. Accordingly, in the embodiment shown in FIGS. 5 to 7, an undulating or wave cam configuration 1c, 6c is employed, whereby the rotation of the lever 6 in either direction, as shown by the arrows in FIG. 7, will cause the axial movement of the hub.

It is to be understood that the forms of the invention herewith shown and described are to be taken as preferred examples of the same, and that various changes in the shape, size and arrangement of parts may be resorted to, without departing from the spirit of the invention or scope of the subjoined claims.

We claim:

1. In a caliper-type brake operating system having a main brake lever pivotally connected to a housing, and an auxiliary brake lever wherein the auxiliary brake lever is operable independently of the main brake lever for operating the caliper brake actuating cable, the improvement comprising, said auxiliary brake lever being rotatably mounted on the main brake lever housing, cam means connected between the main brake lever housing and the auxiliary brake lever, whereby upon rotational movement of the auxiliary brake lever, the cam means imparts axial movement to the auxiliary brake lever to thereby actuate the brake cable.

2. In a caliper-type brake operating system according to claim 1, wherein the cam means comprises a cam surface provided on said main lever housing, and a cam follower surface provided on one end of the auxiliary lever cooperating with the cam surface on the housing.

3. In a caliper-type brake operating system according to claim 1, wherein the cam means comprises a sleeve extending between the main lever housing and one end of the auxiliary brake lever, a cam surface provided on said sleeve, a hub connected to said one end of the auxiliary brake lever, said hub being rotatably mounted on said sleeve, and a cam follower surface provided on said hub cooperating with the cam surface on the sleeve.

4. In a caliper-type brake operating system according to claim 3, wherein said sleeve is mounted on said housing, said cam surface being formed on the outer peripheral surface of said sleeve, and said cam follower surface being formed on the inner peripheral surface of the hub.

5. In a caliper-type brake operating system according to claim 4, wherein the cam and cam follower surfaces have helical configurations.

6. In a caliper-type brake operating system according to claim 4, wherein the cam and cam follower surfaces have undulating configurations.

* * * * *